US012566602B2

(12) United States Patent
Wei et al.

(10) Patent No.: US 12,566,602 B2
(45) Date of Patent: Mar. 3, 2026

(54) SEAMLESS HOT UPGRADE PROCESS WITH DATABASE SCHEMA CHANGE

(71) Applicant: International Business Machines Corporation, Armonk, NY (US)

(72) Inventors: Jing Jing Wei, Beijing (CN); Yue Wang, Beijing (CN); Yang Kang, Beijing (CN); Yi Fan Wu, Beijing (CN); Shu Jun Tang, Beijing (CN); Jia Lin Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 18/484,561

(22) Filed: Oct. 11, 2023

(65) Prior Publication Data

US 2025/0123835 A1     Apr. 17, 2025

(51) Int. Cl.
| | |
|---|---|
| *G06F 9/44* | (2018.01) |
| *G06F 8/656* | (2018.01) |
| *G06F 16/21* | (2019.01) |
| *G06F 16/23* | (2019.01) |

(52) U.S. Cl.
CPC ............ *G06F 8/656* (2018.02); *G06F 16/211* (2019.01); *G06F 16/2379* (2019.01)

(58) Field of Classification Search
CPC ..... G06F 8/656; G06F 16/2379; G06F 16/211
See application file for complete search history.

(56) References Cited

U.S. PATENT DOCUMENTS

| | | | |
|---|---|---|---|
| 8,812,620 B2 | 8/2014 | Reisman | |
| 10,452,646 B2* | 10/2019 | Schlarb | ............... G06F 21/6218 |
| 10,635,658 B2* | 4/2020 | Yam | ........................... G06F 8/65 |
| 11,537,570 B2 | 12/2022 | Bamel | |
| 2023/0169049 A1* | 6/2023 | Sgroi | .................. G06F 16/2282 |
| | | | 707/803 |

FOREIGN PATENT DOCUMENTS

CN        114816662 A        7/2022

OTHER PUBLICATIONS

Anonymous, "Knative is an Open-Source Enterprise-level solution to build Serverless and Event Driven Applications", https://knative.dev/docs/, (Retrieved: Aug. 22, 2023), 6 Pages.
Anonymous, "OpenKruise", https://openkruise.io/, (Retrieved: Aug. 22, 2023), 3 Pages.

* cited by examiner

*Primary Examiner* — Qamrun Nahar
(74) *Attorney, Agent, or Firm* — CANTOR COLBURN LLP; Joseph P. Curcuru

(57) ABSTRACT

A computer-implemented method for executing a hot upgrade process is provided. The computer-implemented method includes receiving a process upgrade request during executions of first and second tasks by an old container, determining that the process upgrade request affects the first task but not the second task, labeling the first task but not the second task and acting on the process upgrade request. The computer-implemented method further includes, based on the labeling, storing the first task by the old container and executing the second task by the old container, deleting the old container and instantiating a new container for transformation and execution of the first task.

20 Claims, 6 Drawing Sheets

100

101 CLIENT COMPUTER

110 PROCESSOR SET

120 PROCESSING CIRCUITRY         CACHE 121

111 COMMUNICATION FABRIC

112 VOLATILE MEMORY

113 PERSISTENT STORAGE

122 OPERATING SYSTEM

1001

114 PERIPHERAL DEVICE SET

124

123 UI DEVICE SET     STORAGE     IoT SENSOR SET 125

115 NETWORK MODULE

102 WAN

END USER DEVICE 103

REMOTE SERVER 104

REMOTE DATABASE 130

PRIVATE CLOUD 106

140 GATEWAY

PUBLIC CLOUD 105

141 CLOUD ORCHESTRATION MODULE     HOT PHYSICAL MACHINE SET 142

143 VIRTUAL MACHINE SET     CONTAINER SET 144

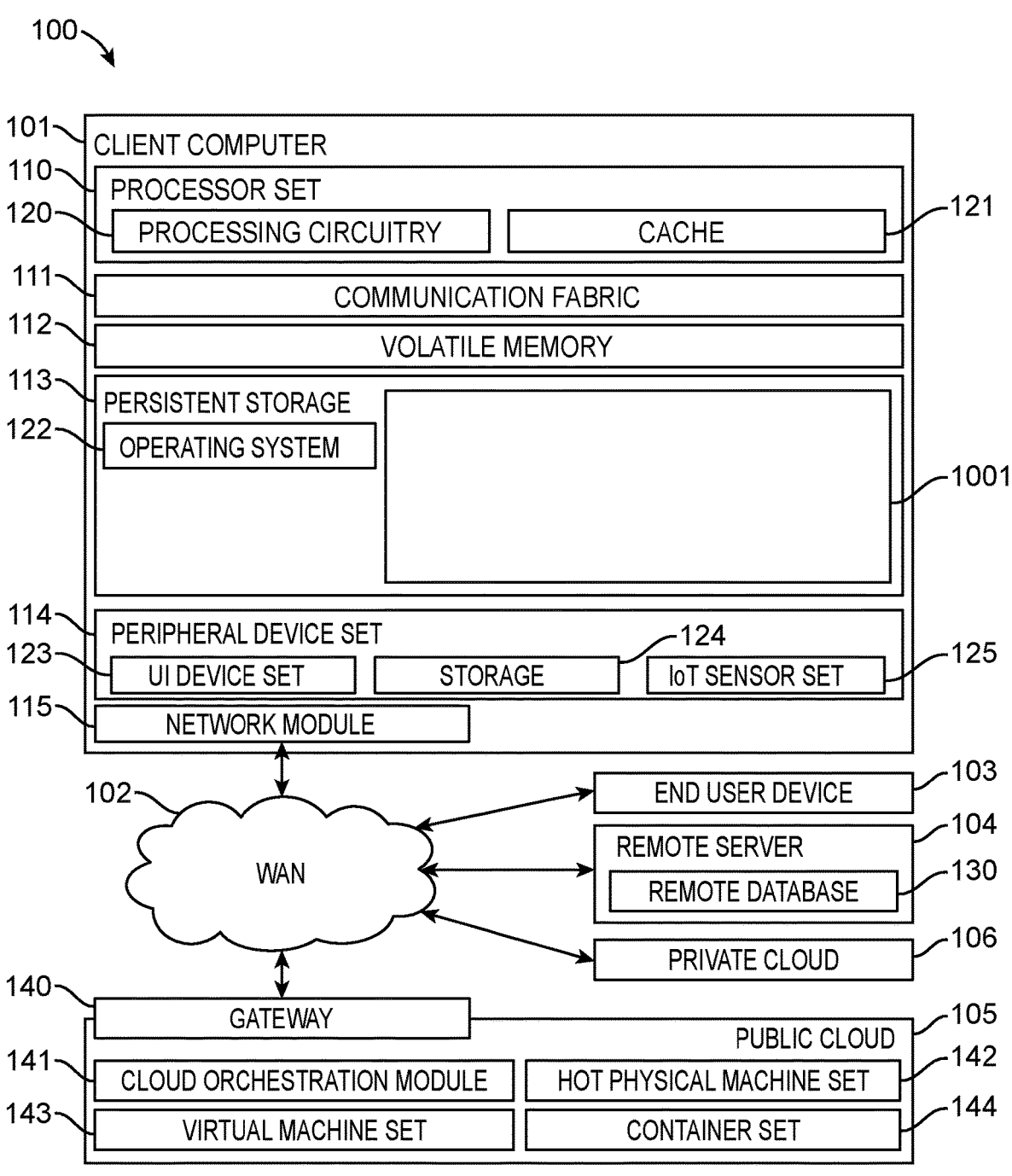

FIG. 1

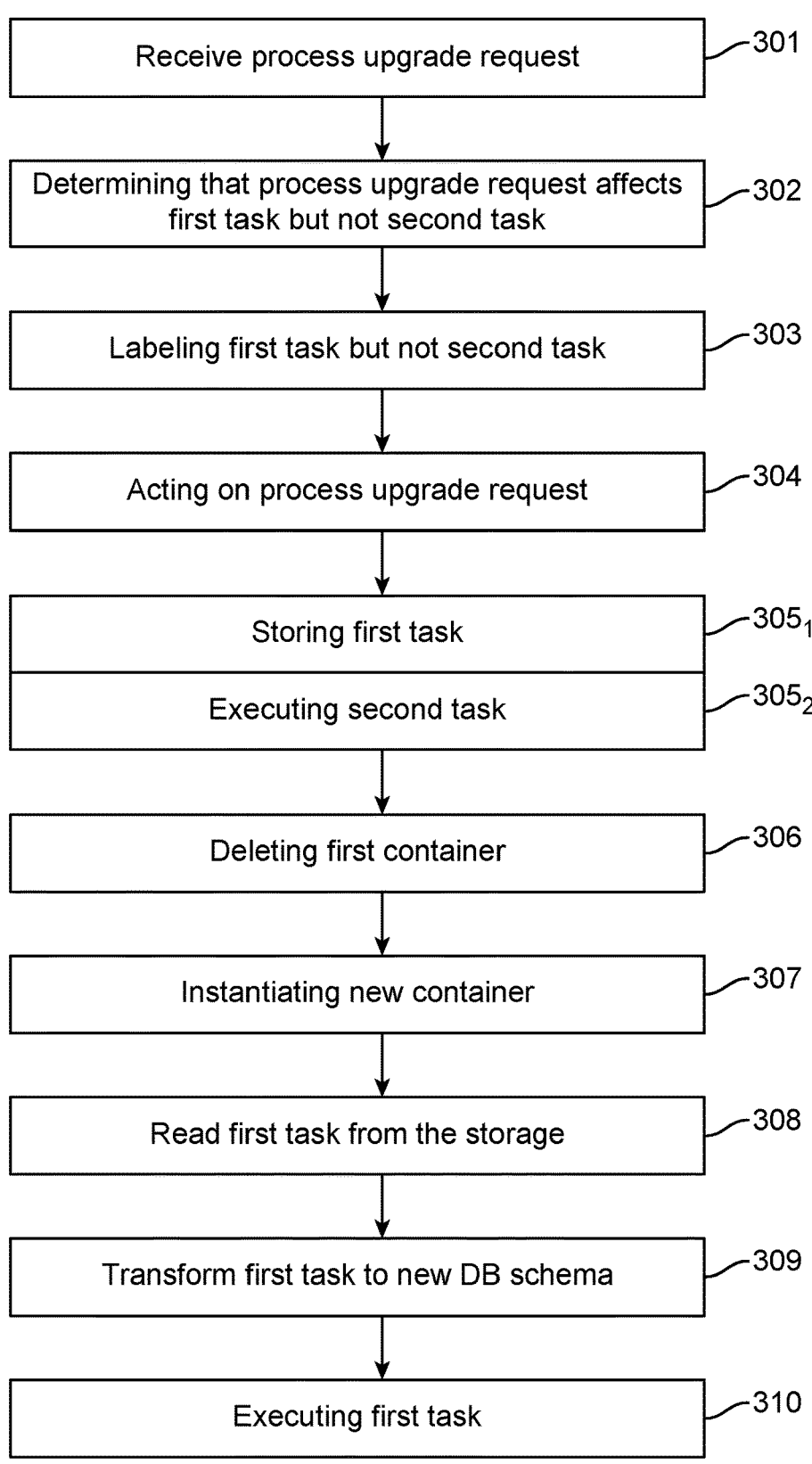

Receive process upgrade request — 301

Determining that process upgrade request affects first task but not second task — 302

Labeling first task but not second task — 303

Acting on process upgrade request — 304

Storing first task — $305_1$

Executing second task — $305_2$

Deleting first container — 306

Instantiating new container — 307

Read first task from the storage — 308

Transform first task to new DB schema — 309

Executing first task — 310

FIG. 3

SEAMLESS HOT UPGRADE PROCESS WITH DATABASE SCHEMA CHANGE

BACKGROUND

The present invention generally relates to hot upgrade processes. More specifically, the present invention relates to a method for a seamless hot upgrade process with a database (DB) schema change in a cloud environment.

Hot patching, also known as live patching or dynamic software updating, is the application of patches without shutting down and restarting a system or a program concerned. Hot patching addresses problems related to unavailability of service provided by the system or the program. Cloud providers often use hot patching to avoid downtime for customers when updating underlying infrastructure.

SUMMARY

Embodiments of the present invention are directed to a computer-implemented method for executing a hot upgrade process. A non-limiting example of the computer-implemented method includes receiving a process upgrade request during executions of first and second tasks by an old container, determining that the process upgrade request affects the first task but not the second task, labeling the first task but not the second task, acting on the process upgrade request, based on the labeling, storing the first task by the old container and executing the second task by the old container, deleting the old container and instantiating a new container for transformation and execution of the first task. Additionally or alternatively, an execution of the computer-implemented method provides for a process server that can continue to provide services during process upgrades without service stop-and-start operations whereby customers will not experience any disruption during process upgrades. This improves throughput and decreases the number of failed tasks.

Embodiments of the present invention are directed to a computer program product for executing a hot upgrade process. A non-limiting example of the computer program product includes one or more computer readable storage media having computer readable program code collectively stored on the one or more computer readable storage media. The computer readable program code is executed by a processor of a computer system to cause the computer system to perform a method. The method includes receiving a process upgrade request during executions of first and second tasks by an old container, determining that the process upgrade request affects the first task but not the second task, labeling the first task but not the second task, acting on the process upgrade request, based on the labeling, storing the first task by the old container and executing the second task by the old container, deleting the old container and instantiating a new container for transformation and execution of the first task. Additionally or alternatively, an execution of the method provides for a process server that can continue to provide services during process upgrades without service stop-and-start operations whereby customers will not experience any disruption during process upgrades. This improves throughput and decreases the number of failed tasks.

Embodiments of the invention are directed to a computing system. A non-limiting example of the computing system includes a processor, a memory coupled to the processor and one or more computer readable storage media coupled to the processor. The one or more computer readable storage media collectively contain instructions that are executed by the processor via the memory to cause the processor to perform steps for executing a hot upgrade process. The steps for executing the hot upgrade process include receiving a process upgrade request during executions of first and second tasks by an old container, determining that the process upgrade request affects the first task but not the second task, labeling the first task but not the second task, acting on the process upgrade request, based on the labeling, storing the first task by the old container and executing the second task by the old container, deleting the old container and instantiating a new container for transformation and execution of the first task. Additionally or alternatively, an execution of the steps for executing the hot upgrade process provides for a process server that can continue to provide services during process upgrades without service stop-and-start operations whereby customers will not experience any disruption during process upgrades. This improves throughput and decreases the number of failed tasks.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 is a schematic diagram of a computing environment for executing a computer-implemented method for operating a chip handling assembly in accordance with one or more embodiments of the present invention;

FIG. 3 is a flow diagram illustrating a computer-implemented method for executing a seamless hot upgrade process in accordance with one or more embodiments of the present invention;

Figure 2:
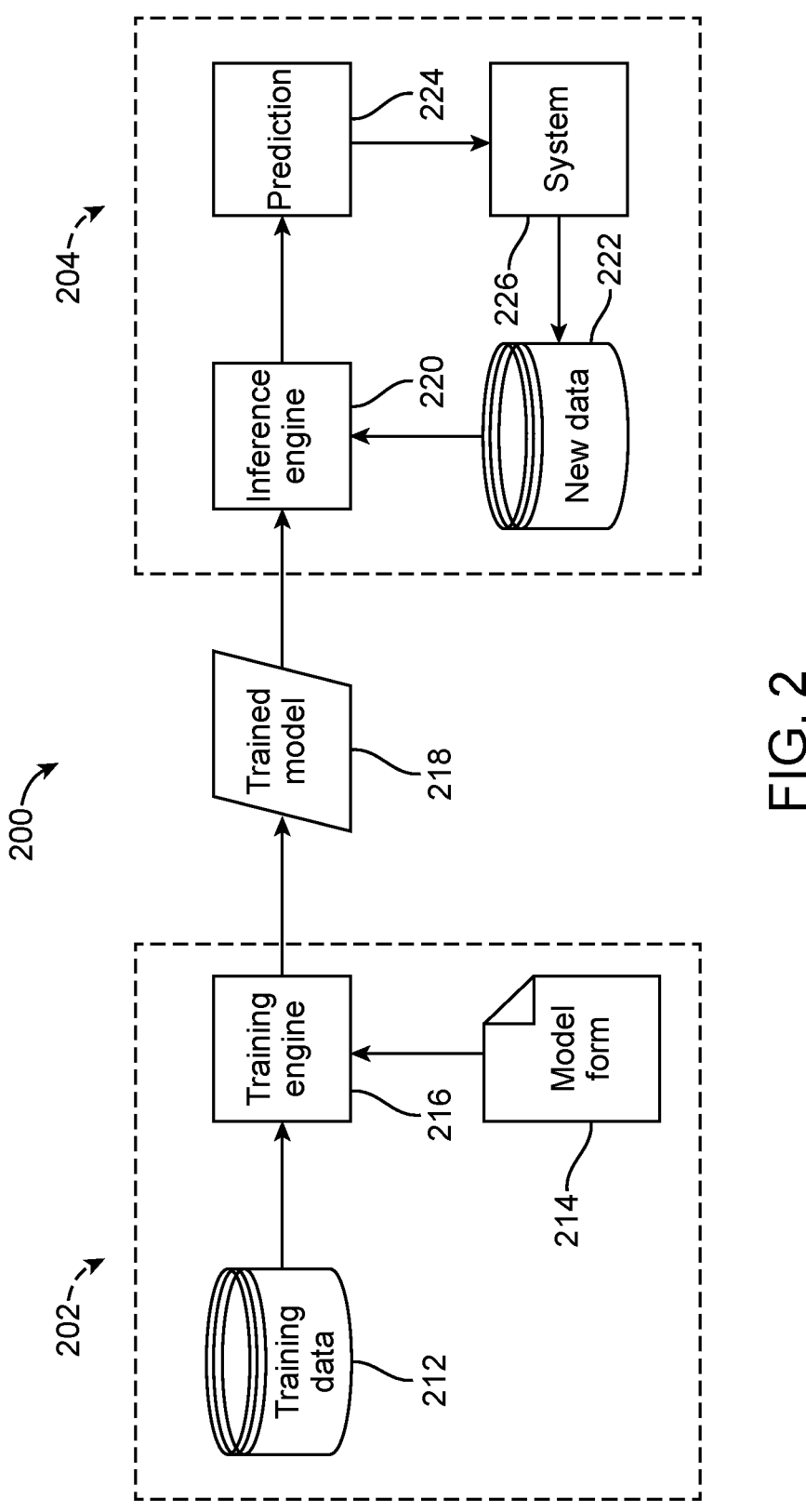
FIG. 2 is a block diagram of components of a machine learning training and inference system according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Embodiments of the present invention are directed to a computer-implemented method for executing a hot upgrade process. A non-limiting example of the computer-implemented method includes receiving a process upgrade request during executions of first and second tasks by an old container, determining that the process upgrade request affects the first task but not the second task, labeling the first task but not the second task, acting on the process upgrade request, based on the labeling, storing the first task by the old container and executing the second task by the old container, deleting the old container and instantiating a new container for transformation and execution of the first task. Additionally or alternatively, an execution of the computer-implemented method provides for a process server that can continue to provide services during process upgrades without service stop-and-start operations whereby customers will not experience any disruption during process upgrades. This improves throughput and decreases the number of failed tasks.

In embodiments, the process upgrade request relates to a database (DB) upgrade. Additionally or alternatively, with the process upgrade request relating to a DB upgrade, the DB upgrade can be executed without a loss of service.

In embodiments, the acting on the process upgrade request includes updating the DB. Additionally or alternatively, with the process upgrade request relating to a DB upgrade, the DB upgrade can be executed without a loss of service.

In embodiments, the second task includes at least one of a task which is executed by the old container when the process upgrade request is received and a task which is not yet executed by the old container when the process upgrade request is received. Additionally or alternatively, the task(s) that are not labeled because they are not related to the process upgrade request.

In embodiments, the determining, the labeling and the acting on the process upgrade request are executed upon reception of the process upgrade request. Additionally or alternatively, with the labeling and the acting on the process upgrade request being executed upon reception of the process upgrade request, the process upgrade request can be addressed at the instant the process upgrade request is received.

In embodiments, the storing and the execution of the second task by the old container are executed during the acting on the process upgrade request with the first and second tasks being labeled and unlabeled, respectively. Additionally or alternatively, with the storing and the execution of the second task by the old container being executed during the acting on the process upgrade request, delays and loss of services can be avoided.

In embodiments, the deleting and the instantiating are executed upon completion of the acting on the process upgrade request, the execution of the second task by the old container is completed prior to the deleting and the computer-implemented method further includes executing the first task by the new container upon instantiation thereof. Additionally or alternatively, the task(s) related to the process upgrade request can be executed using the new application container that is reflective of the DB upgrade.

Embodiments of the present invention are directed to a computer program product for executing a hot upgrade process. A non-limiting example of the computer program product includes one or more computer readable storage media having computer readable program code collectively stored on the one or more computer readable storage media. The computer readable program code is executed by a processor of a computer system to cause the computer system to perform a method. The method includes receiving a process upgrade request during executions of first and second tasks by an old container, determining that the process upgrade request affects the first task but not the second task, labeling the first task but not the second task, acting on the process upgrade request, based on the labeling, storing the first task by the old container and executing the second task by the old container, deleting the old container and instantiating a new container for transformation and execution of the first task. Additionally or alternatively, an execution of the method provides for a process server that can continue to provide services during process upgrades without service stop-and-start operations whereby customers will not experience any disruption during process upgrades. This improves throughput and decreases the number of failed tasks.

In embodiments, the process upgrade request relates to a database (DB) upgrade. Additionally or alternatively, with the process upgrade request relating to a DB upgrade, the DB upgrade can be executed without a loss of service.

In embodiments, the acting on the process upgrade request includes updating the DB. Additionally or alternatively, with the process upgrade request relating to a DB upgrade, the DB upgrade can be executed without a loss of service.

In embodiments, the second task includes at least one of a task which is executed by the old container when the process upgrade request is received and a task which is not yet executed by the old container when the process upgrade request is received. Additionally or alternatively, the task(s) that are not labeled because they are not related to the process upgrade request.

In embodiments, the determining, the labeling and the acting on the process upgrade request are executed upon reception of the process upgrade request. Additionally or alternatively, with the labeling and the acting on the process upgrade request being executed upon reception of the process upgrade request, the process upgrade request can be addressed at the instant the process upgrade request is received.

In embodiments, the storing and the execution of the second task by the old container are executed during the acting on the process upgrade request with the first and second tasks being labeled and unlabeled, respectively. Additionally or alternatively, with the storing and the execution of the second task by the old container being executed during the acting on the process upgrade request, delays and loss of services can be avoided.

In embodiments, the deleting and the instantiating are executed upon completion of the acting on the process upgrade request, the execution of the second task by the old container is completed prior to the deleting and the computer-implemented method further includes executing the first task by the new container upon instantiation thereof. Additionally or alternatively, the task(s) related to the process upgrade request can be executed using the new application container that is reflective of the DB upgrade.

Embodiments of the invention are directed to a computing system. A non-limiting example of the computing system includes a processor, a memory coupled to the processor and one or more computer readable storage media coupled to the processor. The one or more computer readable storage media collectively contain instructions that are executed by the processor via the memory to cause the processor to perform steps for executing a hot upgrade process. The steps for executing the hot upgrade process include receiving a process upgrade request during executions of first and second tasks by an old container, determining that the process upgrade request affects the first task but not the second task, labeling the first task but not the second task, acting on the process upgrade request, based on the labeling, storing the first task by the old container and executing the second task by the old container, deleting the old container and instantiating a new container for transformation and execution of the first task. Additionally or alternatively, an execution of the steps for executing the hot upgrade process provides for a process server that can continue to provide services during process upgrades without service stop-and-start operations whereby customers will not experience any disruption during process upgrades. This improves throughput and decreases the number of failed tasks.

In embodiments, the process upgrade request relates to a database (DB) upgrade. Additionally or alternatively, with the process upgrade request relating to a DB upgrade, the DB upgrade can be executed without a loss of service.

In embodiments, the acting on the process upgrade request includes updating the DB. Additionally or alternatively, with the process upgrade request relating to a DB upgrade, the DB upgrade can be executed without a loss of service.

In embodiments, the second task includes at least one of a task which is executed by the old container when the process upgrade request is received and a task which is not yet executed by the old container when the process upgrade request is received. Additionally or alternatively, the task(s) that are not labeled because they are not related to the process upgrade request.

In embodiments, the determining, the labeling and the acting on the process upgrade request are executed upon reception of the process upgrade request. Additionally or alternatively, with the labeling and the acting on the process upgrade request being executed upon reception of the process upgrade request, the process upgrade request can be addressed at the instant the process upgrade request is received.

In embodiments, the storing and the execution of the second task by the old container are executed during the acting on the process upgrade request with the first and second tasks being labeled and unlabeled, respectively. Additionally or alternatively, with the storing and the execution of the second task by the old container being executed during the acting on the process upgrade request, delays and loss of services can be avoided.

In embodiments, the deleting and the instantiating are executed upon completion of the acting on the process upgrade request, the execution of the second task by the old container is completed prior to the deleting and the computer-implemented method further includes executing the first task by the new container upon instantiation thereof. Additionally or alternatively, the task(s) related to the process upgrade request can be executed using the new application container that is reflective of the DB upgrade.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, a computer or computing device 100 that implements a computer-implemented method for executing a hot upgrade process. The computer or computing device 100 of FIG. 1 contains an example of an environment for the execution of at least some of the computer code involved in performing the inventive methods, such as the block 1001 of the computer-implemented method for executing a hot upgrade process. In addition to the computer-implemented method for executing a hot upgrade process of block 1001, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IoT)

sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 701 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud Turning now to an overview of technologies that are more specifically relevant to aspects of the invention, when a process upgrade request is received and requires a database (DB) upgrade, processes running in a current/old container may have ongoing tasks. In order to act on the process upgrade request, the current/old container typically needs to continue with one or more of the ongoing tasks until the longest running one of the ongoing tasks completes. Once this happens, the current/old container and services provided by the current/old container are stopped. Once the current/old container and the services provided by the current/old container are stopped, the DB upgrade associated with the process upgrade request can begin. Once the DB upgrade associated with the process upgrade request is completed, a new container is started whereupon the new container can provide services.

As a general matter, during the DB upgrade associated with the process upgrade request, which can only begin once the longest running one of the ongoing tasks of the current/old container completes, a new task that is affected by a DB schema change of the DB upgrade is preceded by an initiation of a new container or will encounter an error. This leads to runtime delays and service interruptions.

Turning now to an overview of the aspects of the invention, one or more embodiments of the invention address the above-described shortcomings of the prior art by providing a process server that can continue to provide services during process upgrades without service stop-and-start operations whereby customers will not experience any disruption during process upgrades. This improves throughput and decreases the number of failed tasks.

The above-described aspects of the invention address the shortcomings of the prior art by providing a computer-implemented method for executing a hot upgrade process including receiving a process upgrade request during executions of first and second tasks by an old container, determining that the process upgrade request affects the first task but not the second task, labeling the first task but not the second task and acting on the process upgrade request. The computer-implemented method for executing the hot upgrade process further includes, based on the labeling, storing the first task by the old container and executing the second task by the old container, deleting the old container and instantiating a new container for transformation and execution of the first task.

Turning now to a more detailed description of aspects of the present invention, FIG. 2 depicts a block diagram of components of a machine learning training and inference system 200. The machine learning training and inference system 200, in accordance with one or more embodiments of the invention, can utilize machine learning techniques to perform tasks, such as a computer-implemented method for executing a hot upgrade process. Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

With reference to FIG. 3, a computer-implemented method 300 for executing a seamless hot upgrade process in a cloud environment, for example, is provided. As shown in FIG. 1, the computer-implemented method 300 includes receiving a process upgrade request during executions of first and second tasks by an old container (block 301), determining that the process upgrade request affects the first task but not the second task (block 302), labeling the first task but not the second task (block 303) and acting on the process upgrade request (block 304). The computer-implemented method 300 further includes, based on the labeling, storing the first task by the old container (block 3051) and executing the second task by the old container (block 3052), deleting the old container (block 306) and instantiating a new container for transformation and execution of the first task (block 307).

In accordance with embodiments, the process upgrade request can relate to a DB upgrade or another similar type of upgrade (the following description will generally relate to the case in which the process upgrade request relates to the DB upgrade; this is being done for clarity and brevity and should be limit the scope of the application or the claims) and thus the acting on the process upgrade request of block 304 can include updating the DB. Also, the second task can include at least one of a task which is executed by the old container when the process upgrade request is received and a task which is not yet begun to be executed by the old container when the process upgrade request is received.

In accordance with further embodiments, the determining of block 302, the labeling of block 303 and the acting on the process upgrade request of block 304 are executed upon an instant of the reception of the process upgrade request. The storing of block 3051 and the execution of the second task by the old container of block 3052 are executed during the acting on the process upgrade request (i.e., while the acting on the process upgrade request is ongoing) of block 304 with the first and second tasks being labeled and unlabeled, respectively. The deleting of block 306 and the instantiating of block 307 are executed upon completion of the acting on the process upgrade request of block 304 and the execution of the second task by the old container of block 3052 is completed prior to the deleting of block 306. In addition, the computer-implemented method 300 can further include a data transformer module in the new container reading the first task from storage (block 308), transforming the first task to a new DB schema (block 309 and then executing the first task by the new container (block 310).

With continued reference to FIG. 3 and with additional reference to FIGS. 4-6, the computer-implemented method 300 of FIG. 3 will now be described in greater detail.

Figure 4:
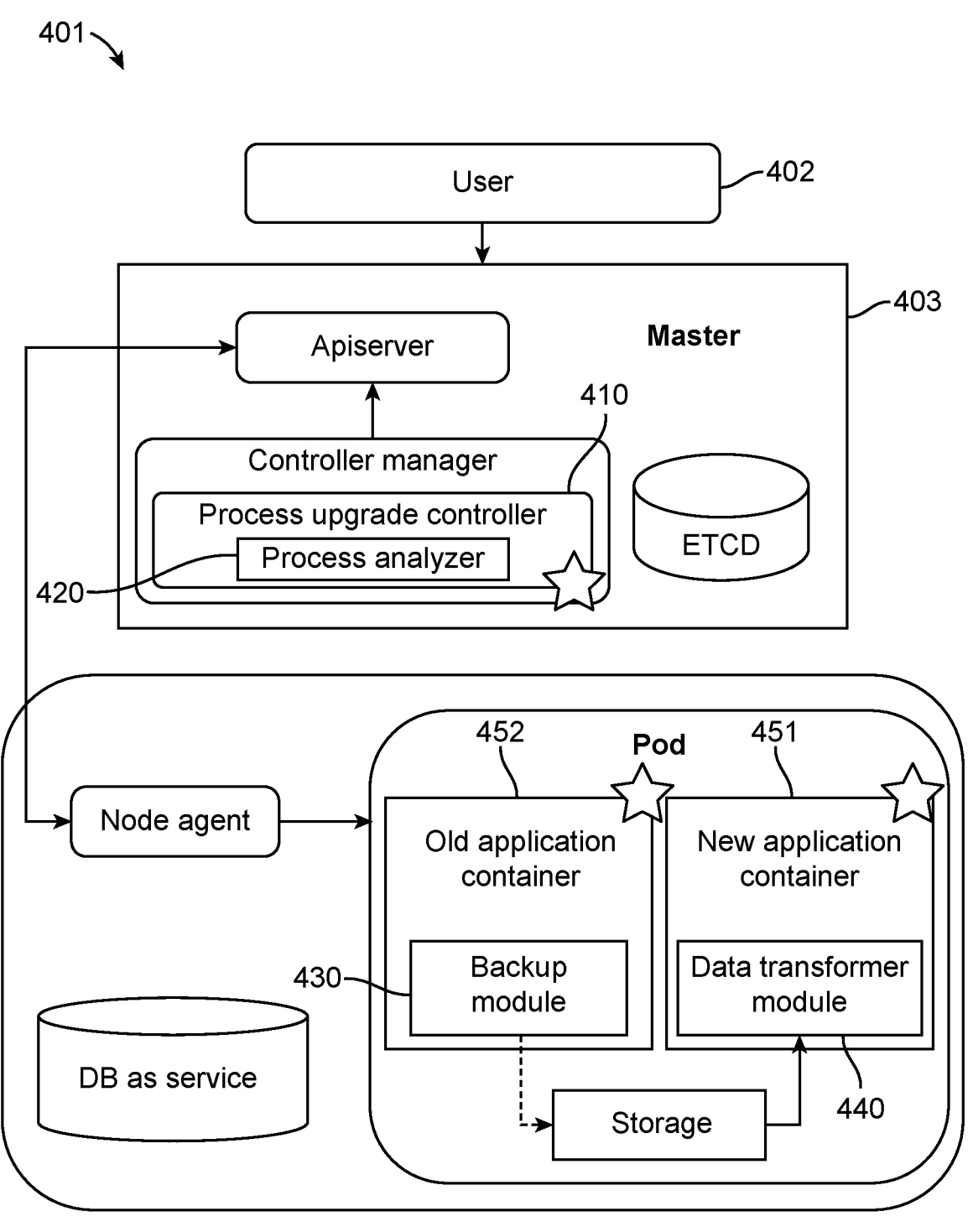
FIG. 4 is a schematic diagram illustrating a computing system or architecture for executing the computer-implemented method of FIG. 3 in accordance with one or more embodiments of the present invention.

As shown in FIG. 4, the computer-implemented method 300 of FIG. 3 can be executed by a computing system or architecture 401 in which an admin 402 requests a process upgrade, which involves a DB upgrade, for example, from a master element 403. The computing system or architecture 401 includes a process upgrade controller 410, a process analyzer 420, a backup module 430 and a data transformer module 440. The process upgrade controller 410 oversees the entire upgrade process, including invoking the process analyzer 420, triggering the database upgrade, monitoring its completion, creating a new application container 451 with the upgraded version and gracefully deleting the old application container 452 (i.e., by awaiting completion of executions of tasks by the old application container). The process analyzer 420 analyzes and labels process tasks impacted by DB upgrade. The backup module 430 is disposed in the old application container 452 and stores tasks that are labeled as being related to the DB upgrade. The data transformer module 440 in the new application container 451 reads the tasks from storage and transforms for transformation and execution by the new application container 452.

In an operational case, the data transformer module 440 in the new application container 452 reads the task from storage and transforms the task to a new DB schema but is not otherwise related to a specific database and is characterized in that a customer provides a data transform script (because the customer knows what changes are made between the two versions—the old application container 451 and the new application container 452). For example, if there is a toolkit (common library) update between the two versions, the customer knows that he/she needs to make process data point to new toolkit reference instead of old ones. In this case, the data can be transformed before it is written to the DB. As another example, if a new column is added, usually in a data transform script it will include a default value or calculated rules to set the value for existing rows in the table, which can be used to set the default value before insertion into the DB.

Figure 5:
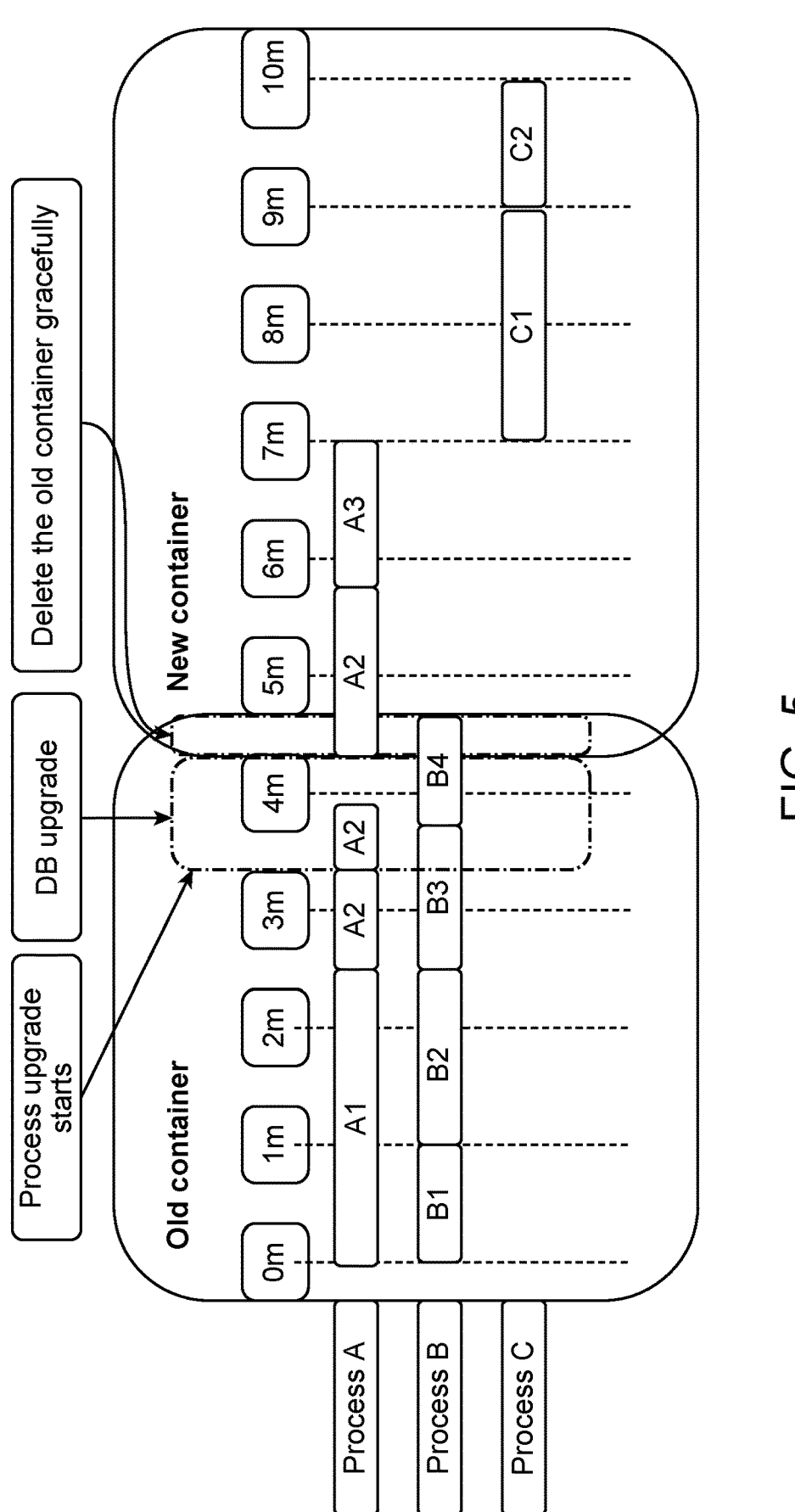
FIG. 5 is a graphical diagram illustrating an execution of the computer-implemented method of FIG. 3 in accordance with one or more embodiments of the present invention.

As shown in FIG. 5, the seamless hot upgrade process in the cloud environment represented by the computer-implemented method 300 of FIG. 3 has ongoing processes A, B and C. Between 0-3+ minutes, task A1 of process A will be executed and completed and task A2 of process A will be started in old container 501; tasks B1 and B2 of process B will be executed and task B3 will be started in the old container 501 while task B4 will not start until close to the 4 minute mark; and no tasks of process C will begin until the 7 minute mark.

At the instant when a process upgrade request that involves a DB upgrade is received at the 3+ minute mark, several things happen. These include the process upgrade request being acted upon by the DB upgrade beginning to be executed. In addition, an analysis of the process upgrade request is done to determine which, if any, tasks are related to the DB upgrade whereupon those tasks that are determined to be related to the DB upgrade are labeled as such and those tasks that are determined to not be related to the DB upgrade are not labeled. At this point, still at the 3+ minute mark, the old container 501 determines which tasks are labeled and which are not labeled and the old container 501 stores the tasks which are labeled (e.g., task A2) in a storage or memory and executes the tasks which are not labeled (e.g., tasks B3 and B4).

Once the DB upgrade is completed at the 4+ minute mark, the old container 501 is gracefully deleted (here, the term "gracefully" refers to the deletion of the old container 501 awaiting the completion of the execution of the final unlabeled task B4 at close to the 5 minute mark) and new container 502 is instantiated. Once the new container 502 is instantiated at the 4+ minute mark, the new container 502 reads the outstanding labeled task A2 from the storage or memory and executes task A2. This execution of task A2 can coincide with the continued execution of task B4 by the old container 501 until the execution of task B4 by the old container 501 is completed and the old container 501 is deleted at close to the 5 minute mark. Subsequently, the new container 502 continues and completes task A2 and the executes and completes task A3 of process A and tasks C1 and C2 of process C.

Figure 6:
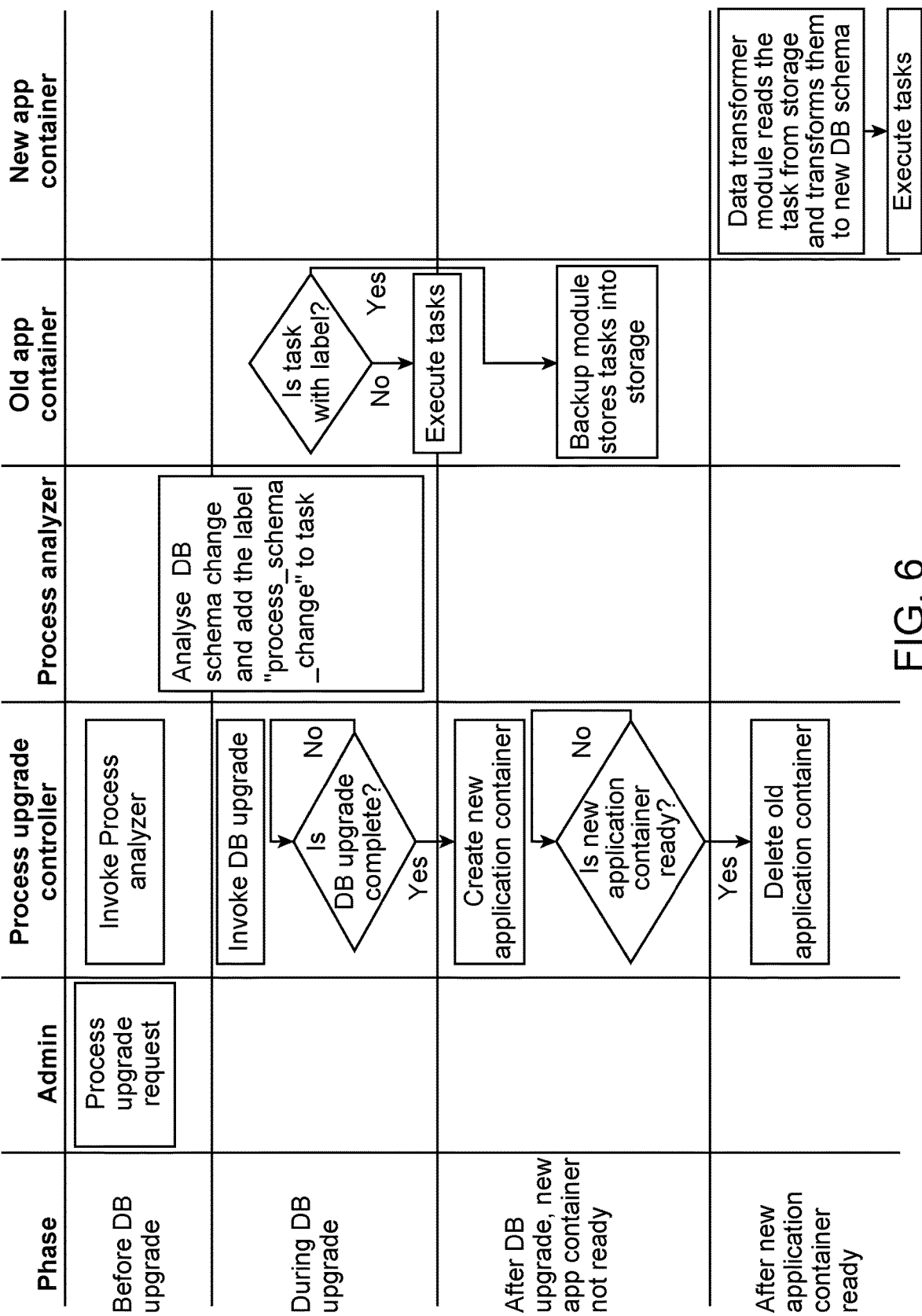
FIG. 6 is a graphical diagram illustrating an execution of the computer-implemented method of FIG. 3 by components of the computing system or architecture of FIG. 4 in accordance with one or more embodiments of the present invention.

With continued reference to FIG. 4 and as shown in FIG. 6, the seamless hot upgrade process in the cloud environment represented by the computer-implemented method 300 of FIG. 3 in accordance with slightly alternative embodiments from those of FIG. 5 begins with admin 402 requesting a process upgrade, which involves a DB upgrade, whereupon the process upgrade controller 410 invokes the process analyzer 420. The process analyzer 420 begins to analyze the DB upgrade to determine which tasks are related to the DB upgrade for labeling. This analysis continues during the DB upgrade during which the process upgrade controller 410 invokes or begins the DB upgrade and continues to execute the DB upgrade until it is completed while the old container 452 determines whether a task is labeled and, if not, executes the task. Once the DB upgrade is completed but before the new container 451 is ready, the process upgrade controller 410 creates or continues to create the new container 451 and determines whether it is ready while the old container 452 stores tasks that are labeled. Once the new container 451 is ready, the old container 452 can be deleted and the data transformer module 440 reads the stored task from storage and transforms them to the new DB schema whereupon the task is executable by the new container 451.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for executing a hot upgrade process, the computer-implemented method comprising:

receiving a process upgrade request during executions of first and second tasks by an old container;

determining that the process upgrade request affects the first task but not the second task;

labeling the first task but not the second task;

acting on the process upgrade request;

based on the labeling, storing the first task by the old container and executing the second task by the old container;

deleting the old container; and instantiating a new container for transformation and execution of the first task.

2. The computer-implemented method according to claim 1, wherein the process upgrade request relates to a database (DB) upgrade.

3. The computer-implemented method according to claim 2, wherein the acting on the process upgrade request comprises updating the DB.

4. The computer-implemented method according to claim 1, wherein the second task comprises at least one of:

a task which is executed by the old container when the process upgrade request is received; and a task which is not yet executed by the old container when the process upgrade request is received.

5. The computer-implemented method according to claim 1, wherein the determining, the labeling and the acting on the process upgrade request are executed upon reception of the process upgrade request.

6. The computer-implemented method according to claim 1, wherein the storing and the execution of the second task by the old container are executed during the acting on the process upgrade request with the first and second tasks being labeled and unlabeled, respectively.

7. The computer-implemented method according to claim 1, wherein:

the deleting and the instantiating are executed upon completion of the acting on the process upgrade request, the execution of the second task by the old container is completed prior to the deleting, and the computer-implemented method further comprises executing the first task by the new container upon instantiation thereof.

8. A computer program product for executing a hot upgrade process, the computer program product comprising one or more computer readable storage media having computer readable program code collectively stored on the one or more computer readable storage media, the computer readable program code being executed by a processor of a computer system to cause the computer system to perform a method comprising:

receiving a process upgrade request during executions of first and second tasks by an old container;

determining that the process upgrade request affects the first task but not the second task;

labeling the first task but not the second task;

acting on the process upgrade request;

based on the labeling, storing the first task by the old container and executing the second task by the old container;

deleting the old container; and instantiating a new container for transformation and execution of the first task.

9. The computer program product according to claim 8, wherein the process upgrade request relates to a database (DB) upgrade.

10. The computer program product according to claim 9, wherein the acting on the process upgrade request comprises updating the DB.

11. The computer program product according to claim 8, wherein the second task comprises at least one of:

a task which is executed by the old container when the process upgrade request is received; and a task which is not yet executed by the old container when the process upgrade request is received.

12. The computer program product according to claim 8, wherein the determining, the labeling and the acting on the process upgrade request are executed upon reception of the process upgrade request.

13. The computer program product according to claim 8, wherein the storing and the execution of the second task by the old container are executed during the acting on the process upgrade request with the first and second tasks being labeled and unlabeled, respectively.

14. The computer program product according to claim 8, wherein:

the deleting and the instantiating are executed upon completion of the acting on the process upgrade request, the execution of the second task by the old container is completed prior to the deleting, and the method further comprises executing the first task by the new container upon instantiation thereof.

15. A computing system comprising:

a processor;

a memory coupled to the processor; and one or more computer readable storage media coupled to the processor, the one or more computer readable storage media collectively containing instructions that are executed by the processor via the memory to cause the processor to perform steps for executing a hot upgrade process comprising:

receiving a process upgrade request during executions of first and second tasks by an old container;

determining that the process upgrade request affects the first task but not the second task;

labeling the first task but not the second task;

acting on the process upgrade request;

based on the labeling, storing the first task by the old container and executing the second task by the old container;

deleting the old container; and instantiating a new container for transformation and execution of the first task.

16. The computing system according to claim 15, wherein the process upgrade request relates to a database (DB) upgrade and the acting on the process upgrade request comprises updating the DB.

17. The computing system according to claim 15, wherein the second task comprises at least one of:

a task which is executed by the old container when the process upgrade request is received; and a task which is not yet executed by the old container when the process upgrade request is received.

18. The computing system according to claim 15, wherein the determining, the labeling and the acting on the process upgrade request are executed upon reception of the process upgrade request.

19. The computing system according to claim 15, wherein the storing and the execution of the second task by the old container are executed during the acting on the process upgrade request with the first and second tasks being labeled and unlabeled, respectively.

20. The computing system according to claim 15, wherein:

the deleting and the instantiating are executed upon completion of the acting on the process upgrade request, the execution of the second task by the old container is completed prior to the deleting, and the method further comprises executing the first task by the new container upon instantiation thereof.

* * * * *